(12) United States Patent
Chung et al.

(10) Patent No.: US 7,664,950 B2
(45) Date of Patent: Feb. 16, 2010

(54) METHOD FOR DYNAMICALLY CHANGING INTRUSION DETECTION RULE IN KERNEL LEVEL INTRUSION DETECTION SYSTEM

(75) Inventors: Bo-Heung Chung, Daejon (KR);
Seungho Ryu, Daejon (KR);
Jeong-Nyeo Kim, Daejon (KR);
Sung-Won Sohn, Daejon (KR);
Chee-Hang Park, Daejon (KR)

(73) Assignee: Electronics and Telecommunications Research Institute (KR)

( * ) Notice: Subject to any disclaimer, the term of this patent is extended or adjusted under 35 U.S.C. 154(b) by 805 days.

(21) Appl. No.: 10/748,406

(22) Filed: Dec. 29, 2003

(65) Prior Publication Data

US 2005/0102505 A1 May 12, 2005

(30) Foreign Application Priority Data

Nov. 11, 2003 (KR) .................. 10-2003-0079581

(51) Int. Cl.
*H04L 29/06* (2006.01)
(52) U.S. Cl. ........................................ 713/164; 726/22
(58) Field of Classification Search .................. 713/164
See application file for complete search history.

(56) References Cited

U.S. PATENT DOCUMENTS

| | | | | |
|---|---|---|---|---|
| 5,210,854 A | * | 5/1993 | Beaverton et al. ........... | 717/174 |
| 5,359,730 A | * | 10/1994 | Marron ........................ | 717/169 |
| 5,634,058 A | * | 5/1997 | Allen et al. .................. | 717/163 |
| 6,272,519 B1 | * | 8/2001 | Shearer et al. .............. | 718/104 |
| 7,024,694 B1 | * | 4/2006 | Ko ............................... | 726/23 |
| 2002/0023211 A1 | * | 2/2002 | Roth et al. ................... | 713/164 |
| 2003/0074487 A1 | * | 4/2003 | Akgul et al. ................. | 709/328 |
| 2004/0015905 A1 | * | 1/2004 | Huima ......................... | 717/141 |

FOREIGN PATENT DOCUMENTS

| | | | |
|---|---|---|---|
| JP | 2000293362 A | * | 10/2000 |
| JP | 2002-342276 | | 11/2002 |
| KR | 2002-91340 | | 12/2002 |
| KR | 2003-49853 | | 6/2003 |

OTHER PUBLICATIONS

Stoica, Ion, Stateless Core: A Scalable Approach for Quality of Service in the Internet, Publication Date: Dec. 15, 2000, PHD Thesis, Carnegie Mellon University, Pertinent p. 139.*

* cited by examiner

*Primary Examiner*—Kimyen Vu
*Assistant Examiner*—Yogesh Paliwal
(74) *Attorney, Agent, or Firm*—Blakely, Sokoloff, Taylor & Zafman

(57) ABSTRACT

A method for dynamically changing an intrusion detection rule in a kernel level intrusion detection system is disclosed. The method includes the steps of: a) generating a replica of the intrusion detection rule in a kernel area; b) changing the replica of the intrusion detection rule according to a request of changing the intrusion detection rule from the kernel area; and c) changing a currently applied intrusion detection rule by exchanging a value of a pointer representing the intrusion detection rule with a value of a pointer representing the changed replica of the intrusion detection rule.

10 Claims, 4 Drawing Sheets

METHOD FOR DYNAMICALLY CHANGING INTRUSION DETECTION RULE IN KERNEL LEVEL INTRUSION DETECTION SYSTEM

FIELD OF THE INVENTION

The present invention relates to a method for dynamically changing an intrusion detection rule in a kernel level intrusion detection system.

DESCRIPTION OF THE PRIOR ART

Hereinafter, an intrusion detection rule management is a term including all of setup/release/change of the intrusion detection rule. Among them, the changing method of the intrusion detection rule is a subject matter of this invention.

In general, an intrusion detection system (IDS) is a security system that monitors in real time a use of network or system and detects an intrusion using an intrusion pattern database and an expert system, in addition to a simple access control function such as firewall.

The intrusion detection system is classified into a network-based system and a host-based (computer-based) system according to monitoring objects. First, the host-based intrusion detection system includes an intrusion detection module at every system. Also, the host-based intrusion detection system uses a log data to monitor activities of internal users in one system and detects a hacking trial. On the contrary, the network-based intrusion detection system includes one intrusion detection module by network unit. Also, the network-based intrusion detection system detects an intrusion using a packet analysis based on a network packet capturing.

In recent years, as the connectivity of computer and the number of users are rapidly increased due to the advance of network environment and Internet, there is an increasing demand for a distributed intrusion detection system that is capable of improving a network security by effectively detecting assaults and intrusions taken through the network.

Meanwhile, a network intrusion detection system based on software agent and multi-sensor are recently developed for detecting complex and various network assaults. However, the network intrusion detection system based on software agent and multi-sensor is not effective to denial of distributed service attack in which a large quantity of packets is propagated to the network, and Internet worm, and the like. Because the network intrusion detection system based on software agent and multi-sensor copies the packets transmitted through the network in the kernel and then transfers them to the agent or the sensor, a plurality of dropped packets occur. In addition, loads occur when such an intrusion detection technology based on application program transfers the packet data copied in the kernel to the application program by using a packet capture library and so on.

As one of methods for solving the above problems, "Real-time Intrusion Detection System based on Linux Kernel" is disclosed in Korean patent application No. 10-2002-0091340.

According to the above Korea patent application, an intrusion detection is performed by modifying a kernel based on a conventional intrusion detection technology and a real-time intrusion detection technology is used which performs a security by additionally providing a Daemon program that is a kind of a security program. In other words, according to the above Korea patent application, the kernel is modified to obtain and store the information on work environment at a point of time when the computer program is executed. The Daemon program, a kind of a security program, uses the stored information to judge a position of a user who commands an operation, an executing system of program, a legality of operation, and the like. Then, a console, an intrusion supervisory controller, an electronic mail, a manager mobile communication terminal and the like are informed of the result.

However, the conventional real-time kernel level intrusion detection technology has following problems.

First, the conventional real-time kernel level intrusion detection technology cannot provide an effective intrusion detection rule changing method for coping with the rapidly changing hacking and network assaults. In other words, according to the conventional real-time intrusion detection technology based on the kernel, a changing or rebooting of the kernel is required in case the intrusion detection rule is changed, and it is difficult to guarantee the continuity of kernel for the intrusion detection. Accordingly, the adaptability for new hacking and assault is lowered, which may be a seriously dangerous factor with respect to the effective intrusion prevention and network security.

Second, the conventional real-time kernel level intrusion detection technology cannot provide an effective method for managing an intrusion detection rule. Specifically, in the intrusion detection rule that is managed in a kernel memory, the intrusion detection process and the intrusion detection rule changing process may be performed at the same time. Therefore, an effective intrusion detection rule changing method is necessary which can change the intra-kernel intrusion detection rule without interfering with the intra-kernel intrusion detection process.

Third, the conventional real-time kernel level intrusion detection technology provides only a method transferring the detected result to the Daemon program of a host in which the kernel operates. In other words, in order for an extension in a current distributed network environment and an interface with a security management system, it is necessary to transfer the detected result to other networks or other hosts (servers) with minimum load. However, the conventional technology is very inefficient because the intra-kernel detection result is transferred to the application program and then again transferred to other application programs through the kernel.

Accordingly, there is an increasing demand for an intrusion detection rule changing method and an effective intrusion detection rule managing method, which are capable of guaranteeing the continuity of the intra-kernel intrusion detection process. Further, there is an increasing demand for a real-time kernel level intrusion detection technology which is capable of providing both an extension in the distributed network environment and an interface with the security management system.

SUMMARY OF THE INVENTION

It is, therefore, a primary object of the present invention to provide a dynamic changing method of an intrusion detection rule in a kernel level intrusion detection system, in which a replica of the intrusion detection rule used in the intra-kernel intrusion detection process is managed dynamically, and in case a change of an intrusion detection rule is requested from a user area, the changing process is performed to the replica and the exchange (pointer exchange) of the changed replica with the currently applied intrusion detection rule is performed, thereby guaranteeing the continuity of the intrusion detection process even in the change of the intrusion detection rule.

In accordance with one aspect of the present invention, there is provided a method for dynamically changing an intrusion detection rule in a kernel level intrusion detection system, the method including the steps of: a) generating a replica of the intrusion detection rule in a kernel area; b) changing the replica of the intrusion detection rule according to a request of changing the intrusion detection rule from the kernel area; and c) changing a currently applied intrusion detection rule by exchanging a value of a pointer representing the intrusion detection rule with a value of a pointer representing the changed replica of the intrusion detection rule.

In accordance with another aspect of the present invention, there is provided a computer-readable medium storing program for executing a method for dynamically changing an intrusion detection rule in a kernel level intrusion detection system, the method including the steps of: a) generating a replica of the intrusion detection rule in a kernel area; b) changing the replica of the intrusion detection rule according to a request of changing the intrusion detection rule from the kernel area; and c) changing a currently applied intrusion detection rule by exchanging a value of a pointer representing the intrusion detection rule with a value of a pointer representing the changed replica of the intrusion detection rule.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Hereinafter, the preferred embodiments of the present invention will be described in detail with reference to the accompanying drawings.

Figure 1:
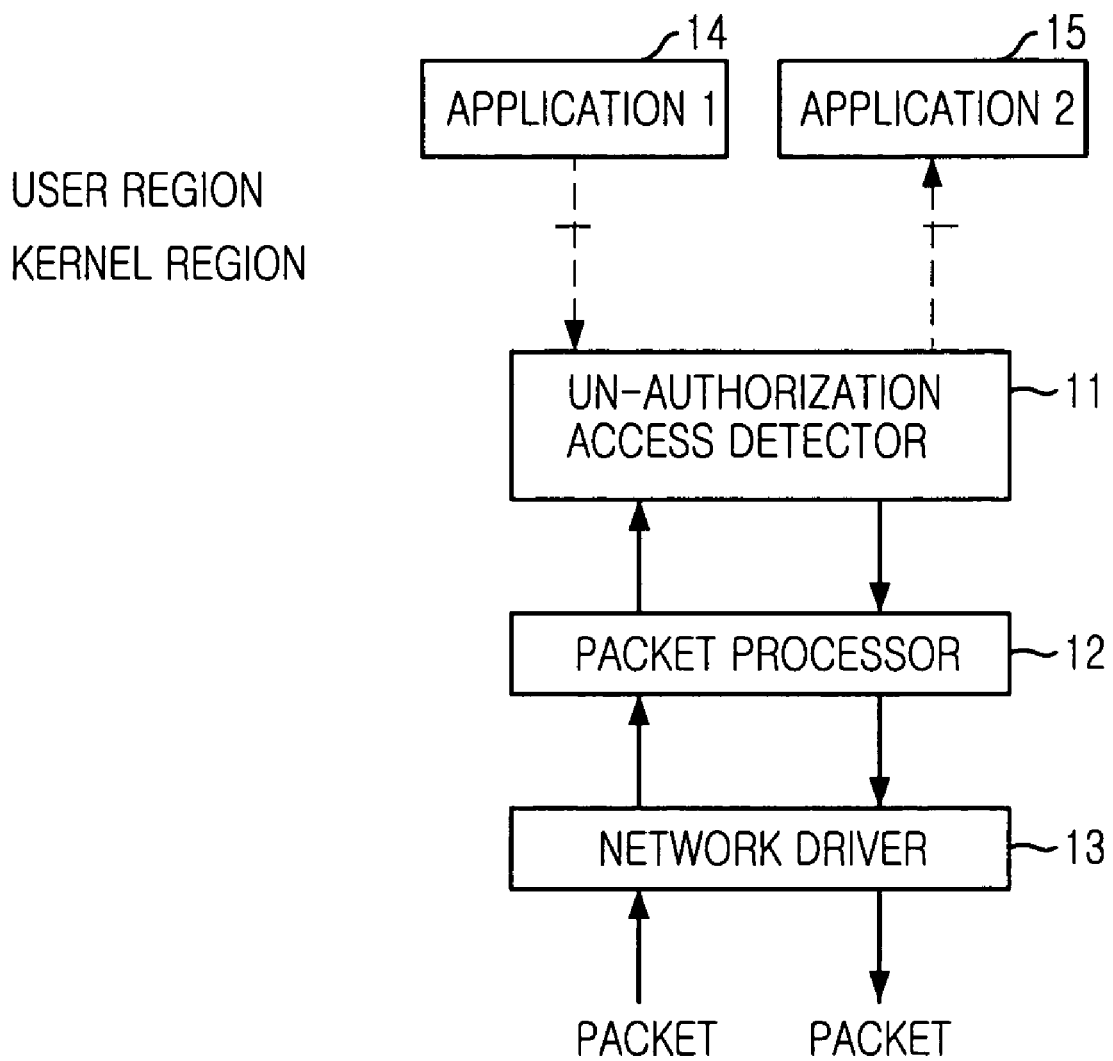
FIG. 1 is a block diagram of a kernel level intrusion detection system in accordance with an embodiment of the present invention.

FIG. 1 is a block diagram of a kernel level intrusion detection system in accordance with the present invention.

Referring to FIG. 1, the kernel level intrusion detection system in accordance with the present invention is largely divided a user area and a kernel area.

First, application programs 14 and 15 of the user area are the extended programs of a system manager or a usage tool (user application program) of a security manager and used to interface with an intra-kernel intrusion detector 11.

The user application programs 15 and 14 perform a function of processing an intrusion detection result received from the intra-kernel intrusion detector 11 and a function of transferring a request for setup/release/change of an intrusion detection rule to the intrusion detector 11 by using a system call, respectively. At this time, in a manner different from the system call, the intrusion detection result can be set to a position to be transferred by setting "out_forwarding" and IP value into "/proc/ids". In other words, if the system manager or the security manager opens "ids" file of "/proc" directory using a general document editor such as "vi" and then changes "out_forwarding" and IP value, the intra-kernel intrusion detector 11 applies it and transfers the intrusion detection result. At this time, "/proc/ids" file can be changed only by the system manager or the security manager, and users having other authority except for that cannot perform the above operation.

The user application program 15 transfers the transmitted intrusion detection result to a security policy management program, a graphic user interface (GUI) program, a manager console and the like, such that the system manager or the security manager uses it to analyze the intrusion detection result and generate a new intrusion detection rule.

In addition, the user application program 14 requests the setup/release/change of the intrusion detection rule to the intra-kernel intrusion detector 11 by using the system call, thus making it possible for the kernel to change the intrusion detection rule while successively performing the intrusion detection process. Therefore, a new intrusion detection rule can be applied without rebooting the kernel.

Meanwhile, an intrusion detection process with respect to the network packet is performed in the kernel area by using the intrusion detection document structure. The detected result is then transferred to the application program (analysis module) of the user area, thus making it possible for the application programs 14 and 15 of the user area to perform the analysis or to process the conversion/change with respect to the intrusion detection rule by using the detected result.

Meanwhile, the kernel area of the kernel level intrusion detection system in accordance with the present invention includes the network driver 13, the packet processor 12 and the intrusion detector 11. At this time, the network driver 13 and the packet processor 12 are modules that are basically provided in the kernel, and the intrusion detector 11 is a module that is necessary to perform the method in accordance with the present invention.

The network driver 13 is a basic element provided to the kernel and performs a process to the packet. In other words, among the packets that are transmitted through the network, the packets corresponding to their own IP addresses are transferred to the packet processor 12 and the other packets are bypassed. In addition, if the network driver 13 receives a request of transferring the packet to the network from the user application programs or other module of the kernel, the network driver 13 transfers these packets to the network.

The packet processor 12 functions to transfer the packets received through the network driver 13 to the intrusion detector 11. Since the packet processor 12 is a transmission control protocol/Internet protocol (TCP/IP) stack implementation code in most cases, the packet processor 12 can be considered as a basic element. Also, the packet processor 12 can be implemented to perform a function of checking source IP/port and destination IP/port with respect to the packet and filtering the packets.

Meanwhile, the intrusion detector 11 performs an intrusion detection function and the intrusion detection rule management function. First, in the intrusion detection function, it is checked whether or not there are the packets corresponding to the preset intrusion detection rule every when the packets arrive. If there is the corresponding packet, the intrusion detector 11 performs the function of transferring the packet to the user application program or a manager server of an external host. At this time, basically, the intrusion detection result is transferred to the user application program, or transferred to a corresponding server in case it is set (/proc/ids) to transfer the packet to the external manager server by the system manager or the security manager.

The intrusion detection rule management function is to setup/release/change the intrusion detection rule to be used in the intrusion detection to the kernel. In other words, the system manager or the security manager requests the setup/release/change of the intrusion detection rule to the intra-kernel intrusion detector 11 through the user application program 14 operating in the user area and the intra-kernel intrusion detector 11 performs the setup/release/change of the intrusion detection rule according to the request of the application program 14. The setup/release/change request of the intrusion detection rule is achieved by a method of transferring it to the kernel using a system call function that the user application program provides in the kernel. For this, the system call function that is basically provided to the kernel is extended.

Summing up the functions of the respective elements described above, the intrusion detection process and the intrusion detection rule management process with respect to the packet on the network will be described below in brief.

First, the intrusion detection process will be described below. If the packet on the network is inputted through the network driver 13, the inputted packet is transferred to the packet processor 12. The packet processor 12 performs a basic function (packet heater error check and so on) defined in the TCP/IP stack and then transfers the result to the intrusion detector 11. Then, the intrusion detector 11 performs the intrusion detection process to the received packet according to the intrusion detection rule. If the intrusion is found, the result is transferred to the user application program 15 of the user area or the manager server of the preset external host.

Meanwhile, in the intrusion detection rule management process (setup/release/change process), the system manager or the security manager requests the setup/release/change of the intrusion detection rule to the user application program 14 using the manager console, the graphic user interface (GUI), and the like, and the user application programs 14 and 15 transfer the setup/release/change request of the intrusion detection rule to the intrusion detector 11 using the system call function. Then, the intrusion detector 11 performs the setup/release/change of the intrusion detection rule according to the setup/release/change request.

In that manner, according to the intrusion detection system in accordance with the present invention, the intrusion detection process and the intrusion analysis process can be separated from each other. Therefore, a search/analysis module can be operated in different system, not one system. Alternatively, the intrusion detection system has so flexible a structure that a plurality of detection modules can be operated in a plurality of distributed systems. Further, since the detection process is performed in the kernel area, a fast detection speed can be guaranteed compared with the case of using the program of the user area.

Hereinafter, the intrusion detection rule changing process and the intrusion detection process will be described in detail with reference to FIGS. 2 to 4.

Figure 2:
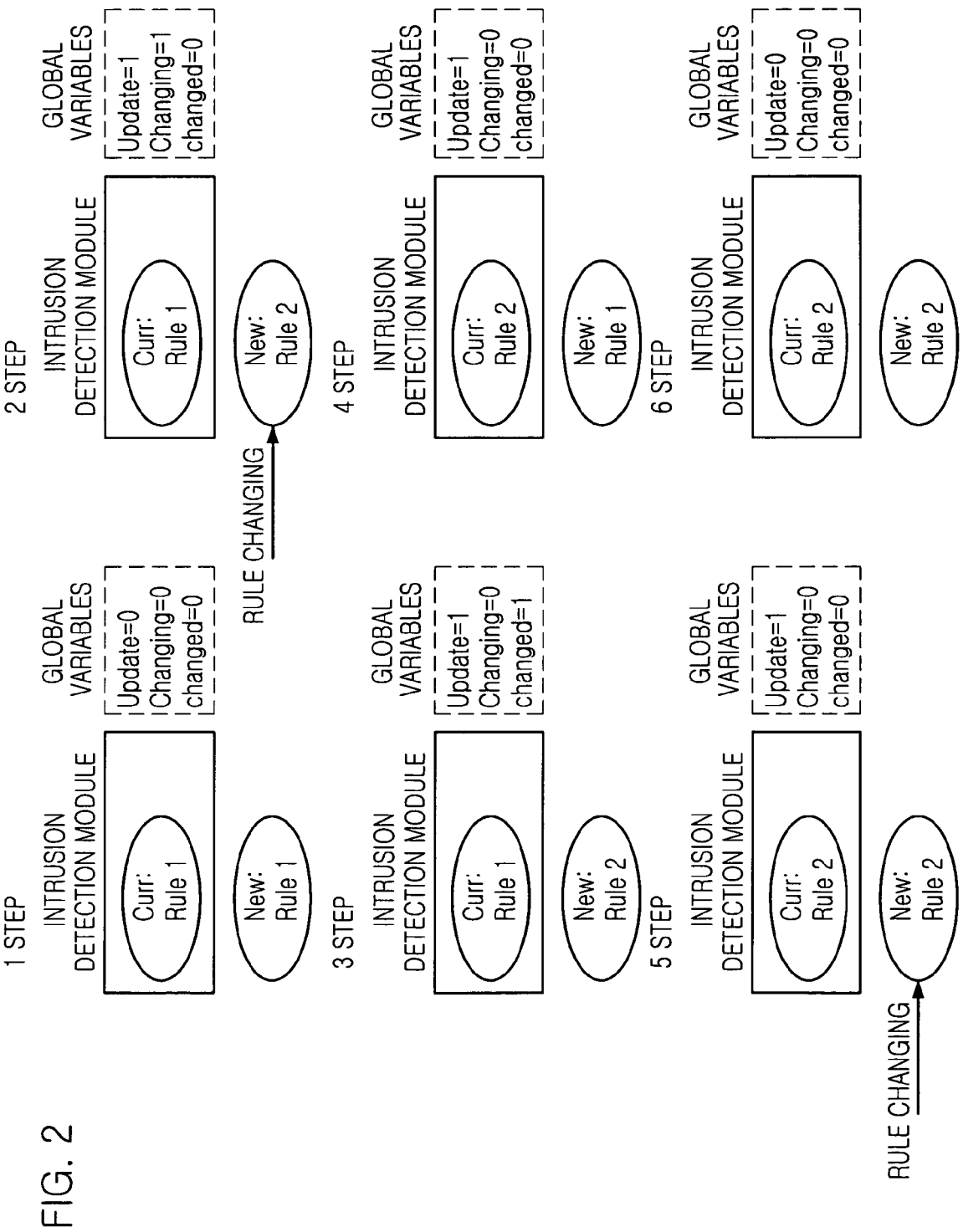
FIG. 2 is an explanatory diagram illustrating a changing method of an intrusion detection rule in a kernel level intrusion detection system in accordance with an embodiment of the present invention.

FIG. 2 is an explanatory diagram illustrating the intrusion detection rule changing method in the kernel level intrusion detection system in accordance with the present invention.

As shown in FIG. 2, the intrusion detection rule changing method in the kernel level intrusion detection system in accordance with the present invention is largely divided into six steps, in which all their document structures are processed in the kernel memory.

First, "Curr" is a pointer representing the intrusion detection rule used in the current intrusion detection process, and "New" is a pointer representing a replica of the current intrusion detection rule and the pointer "New" is used in the change of the intrusion detection rule. Additionally, intra-kernel global variables "Update", "Changing" and "Changed" are additionally used to represent the states of the intrusion detection rule change.

A first step represents a state that an intra-kernel initial intrusion detection rule is set up. The pointer "Curr" indicates a rule 1 and the pointer "New" indicates a replica of the rule 1. Also, the global variables "Update", "Changing" and "Changed" are in initialized states of "0".

A second step represents a case when the request of changing the currently applied intrusion detection rule occurs. At this time, since the pointer "Curr" is used in the current intrusion detection process, a process of changing the rule 1 represented by the pointer "New" into the rule 2 is performed. The global variables "Update" and "Changing" are set to "1", thereby representing that the current intrusion detection rule is changing.

A third step represents a state that the change of the intrusion detection rule is completed. The global variable "Changing" is set to "0" and the global variable "Changed" is set to "1", thereby representing that the change of the intrusion detection rule with respect to the replica ("New") is completed.

A fourth step represents a state that the current intrusion detection rule is newly changed by exchanging the pointers "Curr" and "New". The intrusion detection can be performed using the new intrusion detection rule. At this time, the global variable "Changed" is set to "0", thereby representing that the current intrusion detection rule is changed.

Since the intrusion detection rule represented by the current pointer "Curr" is not identical to that represented by the pointer "New", a fifth step performs a process of changing the rule 1 into the rule 2 in order to match them.

A sixth step is a state that all the intrusion detection rule changing processes are completed. Since the intrusion detection rule represented by the pointer "Curr" is identical to that represented by the pointer "New", the global variable "Update" is set to "0".

Since the change of the intrusion detection rule is possible through the above processes without stopping the intra-kernel intrusion detection process, the continuity of the intrusion detection can be guaranteed.

Figure 3:
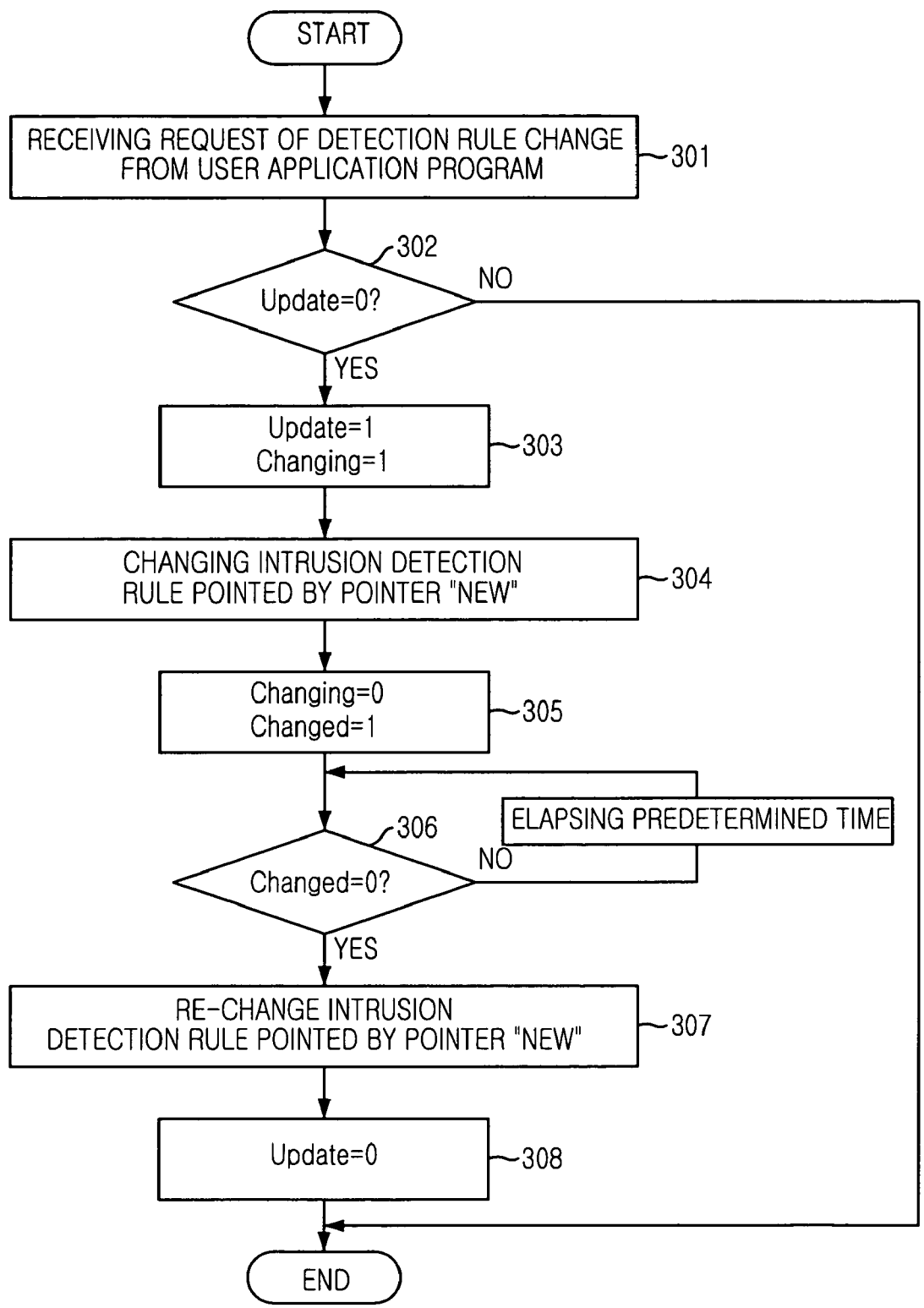
FIG. 3 is a flowchart of an intrusion detection rule changing process in a kernel level intrusion detection system in accordance with an embodiment of the present invention.

FIG. 3 is a flowchart illustrating the intrusion detection rule changing process in the kernel level intrusion detection system in accordance with the present invention.

Referring to FIG. 3, at step 301, the intrusion detector 11 receives the request of changing the detection rule from the application program of the user area. At step 302, the intrusion detector 11 checks whether or not a value of the global variable "Update" is "0".

At step 303, if the value of the global variable "Update" is "0", the values of the global variables "Update" and "Changing" are set to "1". At step 304, the intrusion detection rule represented by the pointer "New" is changed into the new intrusion detection rule. At step 305, if the change of the intrusion detection rule represented by the pointer "New" is completed, the values of the global variables "Changing" and "Changed" are set to "0" and "1", respectively.

Then, at step 306, it is checked whether or not the value of the global variable "Changed" is changed into "0". If the value of the global variable "Changed" is not changed into "0", it means that the intrusion detection rule represented by the pointer "Curr" is not changed yet. Therefore, the value of the global variable "Changed" is again checked after a predetermined time. At this time, the change of the intrusion detection rule used in the actual intrusion detection, that is, the change of the intrusion detection rule represented by the pointer "Curr", is achieved during the intrusion detection process. This process will be described later with reference to FIG. 4.

Meanwhile, at step 307, if the value of the global variable "Changed" is changed into "0", the intrusion detection rule represented by the pointer "New" is again changed into the intrusion detection rule represented by the pointer "Curr", thereby making the contents of the intrusion detection rules represented by the pointers "Curr" and "New" identical to each other. At step 308, the value of the global variable "Update" is set to "0", thereby notifying that all the intrusion detection rule changing processes are completed.

Figure 4:
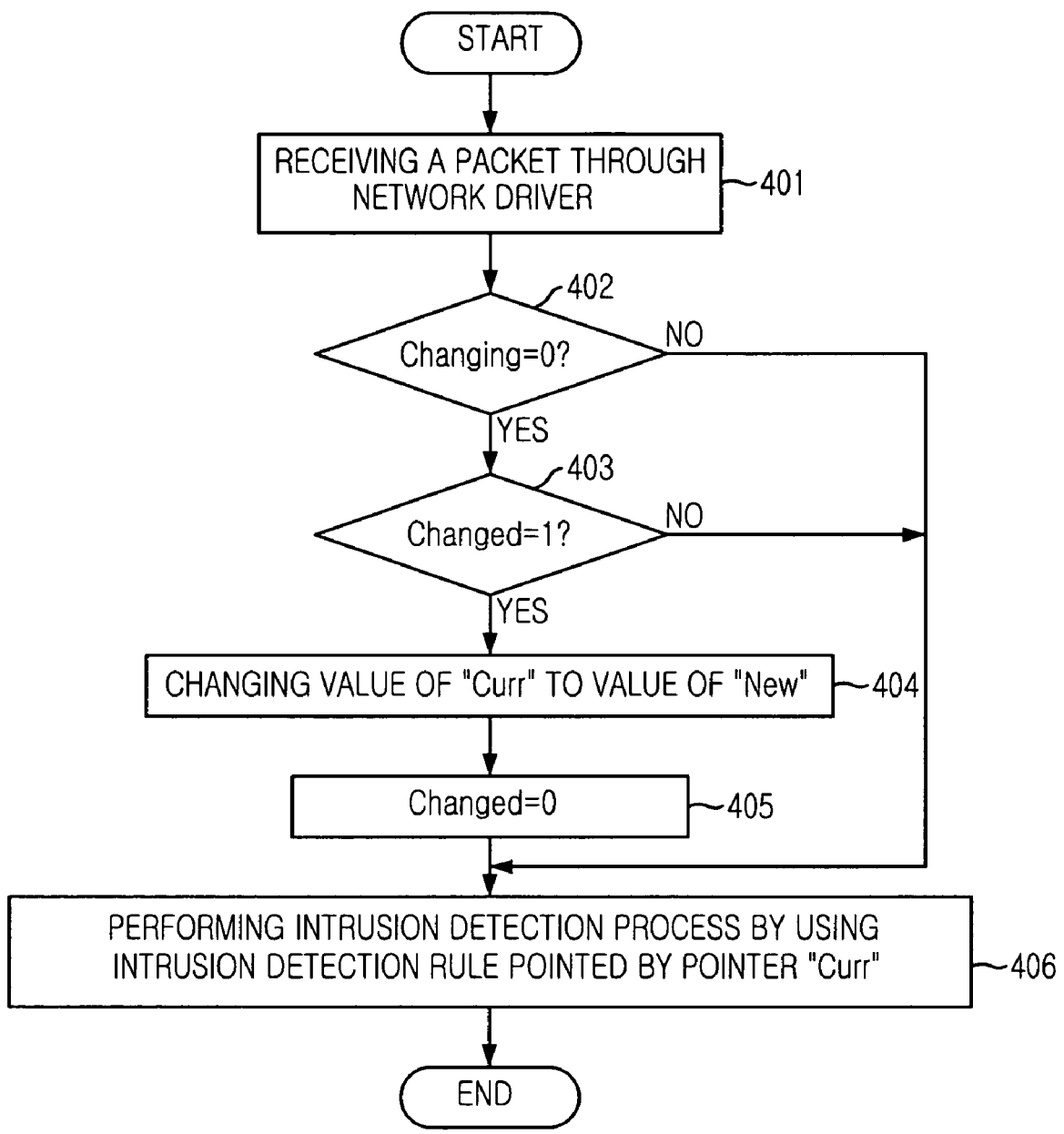
FIG. 4 is a flowchart of an intrusion detection process in a kernel level intrusion detection system in accordance with an embodiment of the present invention.

FIG. 4 is a flowchart illustrating the intrusion detection process in the kernel level intrusion detection system in accordance with the present invention.

At step 401, if the intrusion detector 11 receives the packet through the network driver 13. At step 402, the intrusion detector 11 checks whether or not the value of the global variable "Changing" is "0". At step 403, if the value of the global variable "Changing" is "0", it is checked whether or not the value of the global variable "Changed" is "1". At step 404, if the value of the global "Changed" is "1", the currently applied intrusion detection rule is changed by exchanging the values of the pointers "Curr" and "New" with each other. Then, at step 405, the value of the global variable "Changed" is set to "0". At step 406, the intrusion detection process is performed using the intrusion detection rule represented by the pointer "Curr". At this time, the intrusion detection rule used in the intrusion detection process becomes the newly changed intrusion detection rule.

Meanwhile, as the checking result of the steps 402 and 403, if the value of the global variable "Changing" is "1" or the value of the global variable "Changed" is "0", the process proceeds to the step 406 of performing the intrusion detection process using the intrusion detection rule represented by the current pointer "Curr". At this time, the intrusion detection rule used in the intrusion detection process becomes the unchanged (or previously changed) intrusion detection rule.

As described above, the intrusion detection process is performed separately from the intrusion detection rule changing process. Since the intrusion detection process uses the intrusion detection rule represented by the pointer "Curr", the continuity of the intrusion detection can be guaranteed. The reason is that the intrusion detection rule is changed by a simple process of exchanging the values of the pointers "Curr" and "New" with each other.

Meanwhile, the intra-kernel intrusion detection result detected through the intrusion detection process is transferred to the application program of the user area. Additionally, a forwarding logic inside the kernel is used to transfer the intrusion detection result to an intrusion analysis and security management server existing in a remote.

As described above, according to the present invention, the intra-kernel intrusion detection is performed and the packet filtering and the intrusion analysis are provided not in the application program area but in the kernel area, thereby minimizing the intrusion detection. Further, it is possible to cope with the illegal network intrusion in real time and the network node can be managed systematically by means of the security policy.

As described above, the method in accordance with the present invention can also be stored a computer-readable media (CDROM, RAM, ROM, floppy disk, hard disk, optical magnetic disk, and the like). Since it is apparent to those skilled in the art, a detailed description will be omitted.

According to the present invention, the replica of the intrusion detection rule used in the intra-kernel intrusion detection process is managed dynamically. Therefore, in case the change of the intrusion detection rule is requested from the user area, the changing process is performed to the replica and the exchange (pointer exchange) of the changed replica with the currently applied intrusion detection rule is performed, thereby guaranteeing the continuity of the intrusion detection process even in the change of the intrusion detection rule.

Further, according to the present invention, the global variables are assigned for representing the states of the changes of the intra-kernel intrusion detection rule. Also, using the global variables, the intrusion detection process using the intrusion detection rule and the intrusion detection rule changing process can be performed at the same time, thereby maintaining the consistency of the intrusion detection rule.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for dynamically changing an intrusion detection rule in a kernel level intrusion detection system, the method comprising the steps of:
   a) generating a replica of a current intrusion detection rule in a kernel area, the current intrusion detection rule being pointed by a current pointer;
   b) setting a first global variable when changing the replica of the current intrusion detection rule into a new intrusion detection rule, in response to a request from a user area for changing the intrusion detection rule, the replica being pointed by a new pointer;
   c) setting a second global variable and resetting the first global variable after the replica is changed to indicate to a packet received after step b) that a change to the intrusion detection rule is in process and the packet is to use the new intrusion detection rule;
   d) resetting the second global variable to indicate that the current pointer is pointing to the new intrusion detection rule while the new pointer is pointing to the current intrusion detection rule;
   e) changing the current intrusion detection rule pointed to by the new pointer to the new intrusion detection rule after the second global variable is reset; and
   f) using the new intrusion detection rule on the packet.

2. The dynamic changing method as recited in claim 1, further comprising the step of g) generating a replica of the new intrusion detection rule.

3. The dynamic changing method as recited in claim 1, wherein in the step b) to step d), a change state of the intrusion detection rule with a set of pre-assigned global variables is shown and the current intrusion detection rule is changed according to the set of pre-assigned global variables.

4. The dynamic changing method as recited in claim 3, wherein the kernel area transfers the request of changing the intrusion detection rule from the user area by using a system call.

5. The dynamic changing method as recited in claim 3, wherein the kernel area transfers the intrusion detection result to an application program of a host, the intrusion detection rule being applied to the intrusion detection result, the intrusion detection result being transferred by setting the set of global variables inside the kernel and determining the transferring position inside the kernel.

6. A computer-readable medium storing program instruction for executing a method for dynamically changing an intrusion detection rule in a kernel level intrusion detection system, the method comprising the steps of:
  a) generating a replica of a current intrusion detection rule in a kernel area, the current intrusion detection rule being pointed by a current pointer;
  b) setting a first global variable when changing the replica of the current intrusion detection rule into a new intrusion detection rule, in response to a request from a user area for changing the intrusion detection rule, the replica being pointed by a new pointer;
  c) setting a second global variable and resetting the first global variable after the replica is changed to indicate to a packet received after step b) that a change to the intrusion detection rule is in process and the packet is to use the new intrusion detection rule;
  d) resetting the second global variable to indicate that the current pointer is pointing to the new intrusion detection rule while the new pointer is pointing to the current intrusion detection rule;
  e) changing the current intrusion detection rule pointed to by the new pointer to the new intrusion detection rule after the second global variable is reset; and
  f) using the new intrusion detection rule on the packet.

7. The computer-readable medium as recited in claim 6, further comprising the step of g) generating a replica of the new intrusion detection rule.

8. The computer-readable medium as recited in claim 6 or 7, wherein in the step b) to step d), a change state of the intrusion detection rule with a set of pre-assigned global variables is shown and the current intrusion detection rule is changed according to the set of pre-assigned global variables.

9. The computer-readable medium as recited in claim 8, wherein the kernel area transfers the request of changing the intrusion detection rule from the user area by using a system call.

10. The computer-readable medium as recited in claim 8, wherein the kernel area transfers the intrusion detection result to an application program of a host, the intrusion detection rule being applied to the intrusion detection result, the intrusion detection result being transferred by setting the set of global variables inside the kernel and determining the transferring position inside the kernel.

* * * * *